Hisakazu Mukai
INVENTOR,
BY
Atty

Dec. 1, 1970 HISAKAZU MUKAI 3,544,808

HIGH SPEED SATURATION MODE SWITCHING CIRCUIT FOR A CAPACITIVE LOAD

Filed March 19, 1968 4 Sheets-Sheet 2

BY

United States Patent Office 3,544,808

Patented Dec. 1, 1970

3,544,808

HIGH SPEED SATURATION MODE SWITCHING CIRCUIT FOR A CAPACITIVE LOAD

Hisakazu Mukai, Tokyo, Japan, assignor to Nippon Telegraph and Telephone Public Corporation, Tokyo, Japan, a corporation of Japan Filed Mar. 19, 1968, Ser. No. 714,245
Claims priority, application Japan, Mar. 25, 1967, 42/18,292
Int. Cl. H03k *19/36, 19/40*
U.S. Cl. 307—214 7 Claims

ABSTRACT OF THE DISCLOSURE

In a semiconductor switching circuit including an output transistor connected to a load circuit on its output side, a first transistor is connected to the output side of the output transistor to accelerate charging and discharging of a capacitive load at the time of switching operation of the output transistor and a second transistor is interposed between said two transistors at the emitter junction thereof, the collector electrode of the second transistor being connected to the input side of the output transistor via a branch circuit.

This invention relates to a saturation mode switching circuit wherein an output transistor is utilised in a common emitter configuration, and more particularly to a semiconductor switching circuit suitable for use in integrated high speed logical circuits.

As is well known in the art, switching circuits utilising transistors are classified into the saturation mode switching circuit and the non-saturation mode switching circuit. In the former mode, as the circuit is constructed such that the saturation region of the collector current of the transistor corresponds to the "on" state (logical level "0") and that the cut-off region of the collector current to the "off" state (logical level "1") the switching circuit is stable and the output level of the transistor during "on" time can be made sufficiently low. However, in the former mode, in order to positively maintain "on" state, regardless of the difference in the current amplification factor or variation in the drive current and load current attempts have been made to drive the transistor into deep saturation condition with excessive base currents, in other words to derive more stored charge in the base of the transistor. For this reason, this mode of switching circuit requires longer charge storage time in the reverse recovering time during which the circuit is switched from "on" state to "off" state, thus decreasing the switching speed.

On the other hand, in the latter mode, the collector potential is clamped so as to maintain the "on" state of the transistor in the active region. Use of the transistor in the non-saturation mode results in the elimination of the charge storage time thus increasing the switching speed. For example, in a paper entitled "Non-saturated Inverter" by F. Hilsenrath and J. Walsh, in IBM Technical Disclosure Bulletin, vol. 5, No. 7; December 1962, there is shown a switching circuit wherein a clamp transistor which functions to clamp an output transistor of the common emitter configuration is connected between the base-collector electrodes of the output transistor and a constant voltage source is connected to the base electrode of the clamp transistor. The clamp transistor employed in the circuit disclosed therein functions to bypass the drive current which drives the output transistor when it is "on" state. However, if the transistor is used in the non-saturated state the collector loss of the output transistor would increase so that it is impossible to increase the amplitude of the signal. In addition, as the output transistor operates in its active region there is a tendency that the circuit becomes to oscillate due to delicate coupling between input and output. Further, as the emitter junction of the clamp transistor is reversely biassed when the output transistor is "off" reverse recovery current of the emitter junction is needed in the transient from "on" to "off." This makes the transient time longer.

Accordingly, it is an object of this invention to provide a saturation mode switching circuit wherein an output transistor is employed in the saturated state and the charge storage time thereof is decreased to increase the switching speed of the switching circuit.

Another object of this invention is to provide a switching circuit, which when applied to the integrated circuit, will provide uniform characteristics not affected by the manufacturing conditions.

A further object of this invention is to provide a switching circuit wherein the switching speed is not decreased by transient current caused by parasitic capacitance.

This invention will be more fully understood from the following description given by way of example, reference being had to the accompanying drawings, in which.

Figures 7, 8:
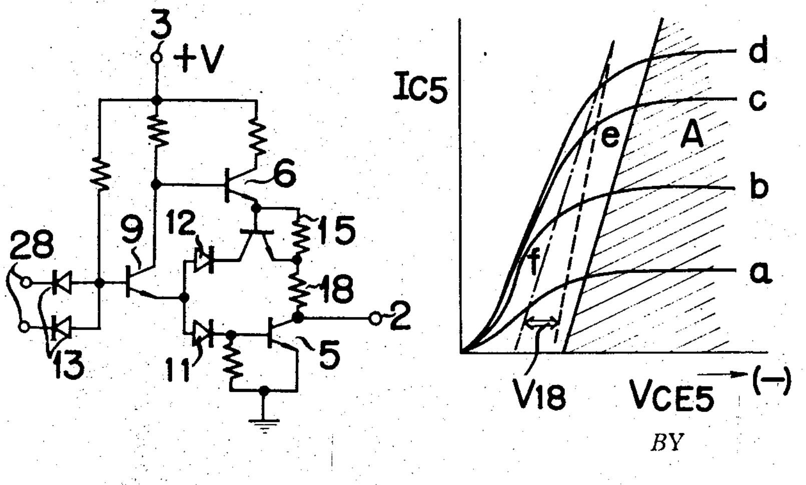

FIGS. 7, *9a* to *9f*, *10a* to *10b* and 11 to 12 illustrate further modifications of the switching circuit of this invention; and FIG. 8 shows characteristic curves to explain the advantages of the switching circuits shown in FIG. 7.

Figure 1:
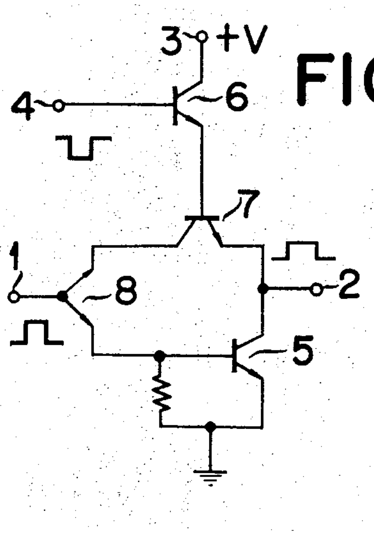
FIG. 1 is a connection diagram illustrating the basic construction of the switching circuit embodying this invention.

Referring now to FIG. 1 which shows the basic construction of this invention, 1 represents a signal input terminal, 2 an output terminal, 3 a source terminal, 4 a terminal to which is applied a signal synchronised with the input signal to the input terminal 1. In order to switch the current flowing through a load circuit (not shown) connected to the output terminal 2 in response to the signal voltage impressed upon the input terminal 1, a control circuit comprising a second transistor 7 is connected between an inverter transistor 5 and a first transistor 6 which operates transiently at the time of switching to charge or discharge the capacitance of the load circuit. The emitter junction of the second transistor 7 is included in a circuit interconnecting the first transistor 6 and the inverter transistor 5, and the collector electrode of the transistor 7 is connected to a branch circuit 8 included in a driving circuit which transmits the signal to the base electrode of the transistor 5 from the input terminal 1. In operation, when a signal voltage as shown in FIG. 1 is applied to the input terminal 1 a voltage is applied to the terminal 4, which synchronously varies in the opposite direction. The basic circuit shown in FIG. 1 operates as follows:

When a signal is impreseed upon the input terminal 1 and as the voltage thereof increases, a signal current is supplied from the input terminal to turn on the transistor 5, thus decreasing the potential of the output terminal. On the other hand, the potential of the terminal 4 decreases when the input signal is applied so that the transistor 6 can not supply sufficient drive current to the load circuit. However, when the transistor 7 becomes saturated to sufficiently decrease its collector potential, a current will flow through the emitter junction of transistor 5 to the collector electrode of the transistor 5 from the transistor 6 with the result that the collector electrode of the transistor 7 absorbs a portion of the driving current to the base electrode of the transistor 5 to the branch circuit 8, thus by-passing it to the collector electrode of the transistor 5. Accordingly, the input driving current to the base electrode of transistor 5 decreases and the potential of the output terminal 2 is maintained at a constant value in response to the load current flowing through the output terminal 2. Thus, the collector potential of transistor 5 is determined by transistors 6 and 7 to control the saturation of the transistor 5. When the voltage impressed upon the input terminal 1 decreases to interrupt the input current, the operating point of the transistor 5 will be restored to the off region but as the voltage of terminal 4 increases in synchronism with the voltage change at the input terminal 1, the transistor 6 will be brought to the condition in which it can supply the driving current to the load through transistor 7. This driving current flows during a transient period until the transistor 5 restores completely and the load capacitance is sufficiently changed up to sufficiently increase the potential of the output terminal 2, thereby decreasing the transient period.

Figure 2:
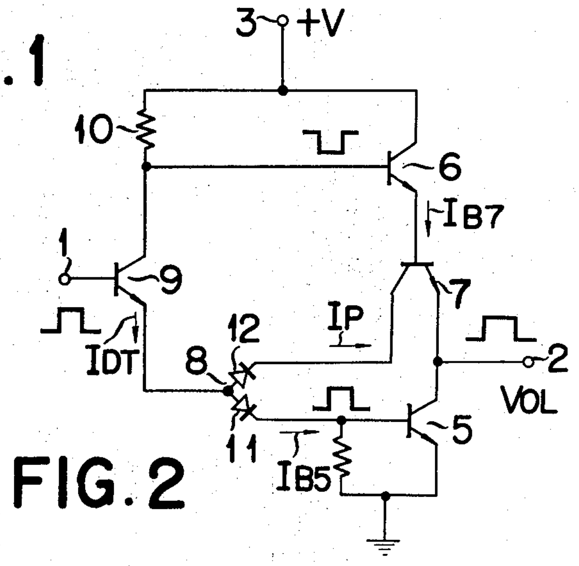
FIG. 2 shows a connection diagram illustrating the basic construction of a practical embodiment of this invention.

In order to have more clear understanding of the advantages of this invention, the embodiment shown in FIG. 2 will be considered. As shown in FIG. 2, an amplifying transistor 9 of the emitter follower connection is connected between the input terminal 1 and the branch circuit 8 and the collector electrode of the transistor 9 is connected to the source terminal 3 via a resistor 10 and to the base electrode of the transistor 6. When current is supplied to the input terminal 1 and when the transistor 9 is in its saturated state while the transistor 5 is in the "on" state, the potential $V_{OL}$ of the output terminal could be shown by the following equation $$V_{OL}=V_{BE5}+V_{BE11}+V_{CES9}-V_{BE6}-V_{BE7} \quad (1)$$

where $V_{BE5}$, $V_{BE6}$ and $V_{BE7}$ respectively represent potential differences between the base and emitter electrodes of transistors 5, 6 and 7, $V_{BE11}$ the voltage across the branch diode 11, $V_{CES9}$ the potential difference between the collector and emitter electrodes of transistor 9 in its saturated state. The transistor 7 operates to assure that the voltage $V_{OL}$ may always be expressed by Equation 1 in response to the current flowing from the load connected to the output terminal 2 and the total driving current $I_{DT}$ is divided into two parts, viz. the current $I_{B5}$ to the base electrode of the transistor 5 and the current $I_P$ by-passed to the collector electrode of the transistor 5 through a diode 12. In this manner, the input current to the base electrode of transistor 5 is controlled in accordance with the load. In Equation 1, the linear combination of $V_{BE5}$, $V_{BE11}$, $V_{BE6}$, $V_{DE7}$ is a small value which is adjustable by the design of these transistors. Thus the value of $V_{OL}$ is close to that of $V_{CES9}$ and the transistor 5 can be set to slightly saturated state corresponding to $V_{OL}$ by suitable design of each term in Equation 1 and saturation voltage of transistor 5.

Variation of the load current flowing into the output terminal 2 results in the variation of the collector saturation voltage of the transistor 5. With this circuit, however, the ratio of the base drive current $I_{B5}$ of the transistor 5 to the by-passed current $I_P$ varies in response to the load current and the variation in the base-emitter voltages of respective transistors corresponding to this current change causes the potential of the output terminal 2 to vary in the same direction as that of the collector saturation voltage of the transistor 5 thus tending to adjust the variation of its saturation level.

Generally, the characteristic values of transistors are greatly influenced by the manufacturing conditions. However, in the integrated circuits, variations in the characteristics of transistors formed in closed spaced relationship on the same wafer are identical. In other words, these are matching characteristics among these transistors. With the illustrated embodiment, according to the Equation 1 which determines output level "0" the sum of forward voltages across two P–N junctions of a transistor and a diode is subtracted from the sum of forward voltages across two P–N junctions of a transistor and a diode. Consequently the difference as in the drop of forward voltage across P–N junctions caused by the variation in the manufacturing conditions cancel each other whereby the output voltage at the output terminal 2 will not be affected by such difference. Further, as the voltage $V_{CES9}$ matches with the saturation voltage of the transistor 5, large variation in the saturation voltages of two transistors that may be caused by the manufacturing conditions would not cause any variation in the controlled saturation level of the transistor 5.

As can be noted from the foregoing description this embodiment assures automatic variation of the control level irrespective of the production spread of the characteristics of semiconductor elements, and the variation in the operating conditions, thus providing the most suitable settings of the saturation level. Such a precise control of the collector voltage of inverter transistor even into the shallow saturation level can never be expected by the method of clamping the collector voltage by the fixed source as illustrated in said IBM Technical Disclosure Bulletin.

Thus, the transistor 5 is controlled to shallow saturation state which is very advantageous to switching characteristics. Whereas the transistor 6 is maintained in a state of conduction for only a very little current when the transistor 5 is in the on state. More particularly, assuming that $\beta_8$ denotes the common emitter current amplification factor of the transistor 7, then the base current $I_{B7}=I_P/\beta_7$ of transistor 7 will be supplied by the emitter current of transistor 6. In other words, the emitter current of the transistor 6 would be limited to $I_{B7}$. In this manner as the operating condition of transistor 6 is controlled by transistor 7, the build up of the emitter current of the transistor 6 when the transistor 9 restores upon reversal of the current supplied by the input terminal 1 is very fast. Thus, the transistor 6 supplies large current to the capacitance of the load circuit connected to the collector electrode of the transistor 5 through output terminal 2.

In the embodiment shown in FIG. 2, when the transistor 5 is in its off state, both transistor 7 and the transient driving transistor 6 are at a high voltage level, so that it is necessary to provide for the branch circuit 8 a reverse current blocking P–N junction 12 in order to prevent reverse flow of current from the collector electrode of the transistor 7 to the branch circuit 8 in case when the voltage level thereof is low.

The embodiment shown in FIG. 2 is comprised by transistors 6 and 7 such that it is possible not only to control the saturation of the transistor 5 but also to control the transistor 6 to a small current operating state so that the build up of the transistor during the reverse recovery period of the transistor 5 is fastened which in turn greatly fastens the recovery of the transistor 5.

Figures 3, 6:
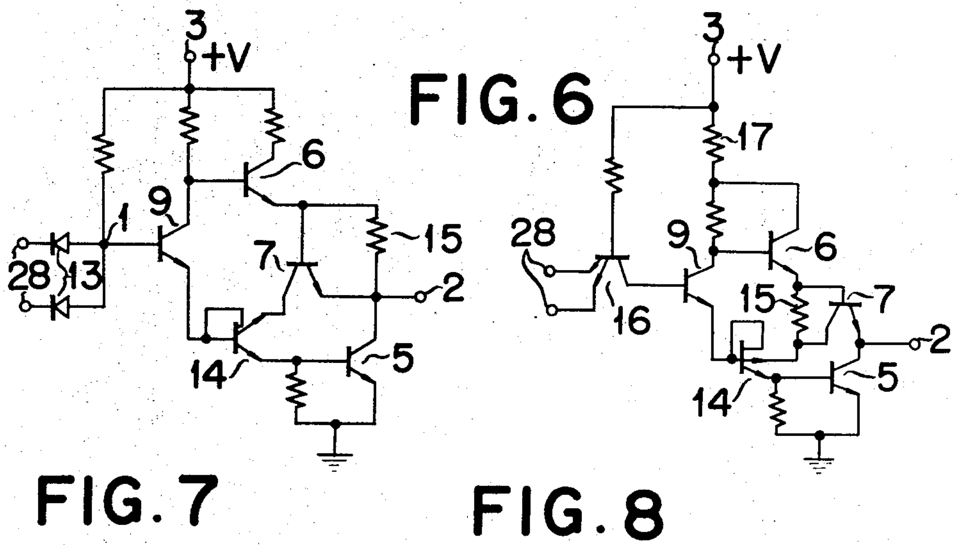
FIG. 3 is a connection diagram of a D.T.L. (diode transistor logic) NAND circuit according to another embodiment of this invention.
FIG. 6 is a connection diagram of a T.T.L. (transistor-transistor logic) NAND circuit according to still another embodiment of this invention.

Referring now to FIG. 3 which is a modification of the embodiment shown in FIG. 2, an AND gate comprising diodes 13 is connected to the input terminal 1 to constitute a DTL-NAND gate circuit. To be suitable for use in the integrated circuit, the diodes 13 included in the branch circuit takes the form of a multiple-emitter transistor whose two emitter electrodes are utilised as diodes. A resistor 15 is connected between base and emitter electrodes of the transistor 7 for the purpose of lowering the output "0" level by slightly increasing the steady current flowing through the transistor 6 when the transistor 5 is in the on state while at the same time to decrease the build up time of the transistor 7.

Figures 4, 5:
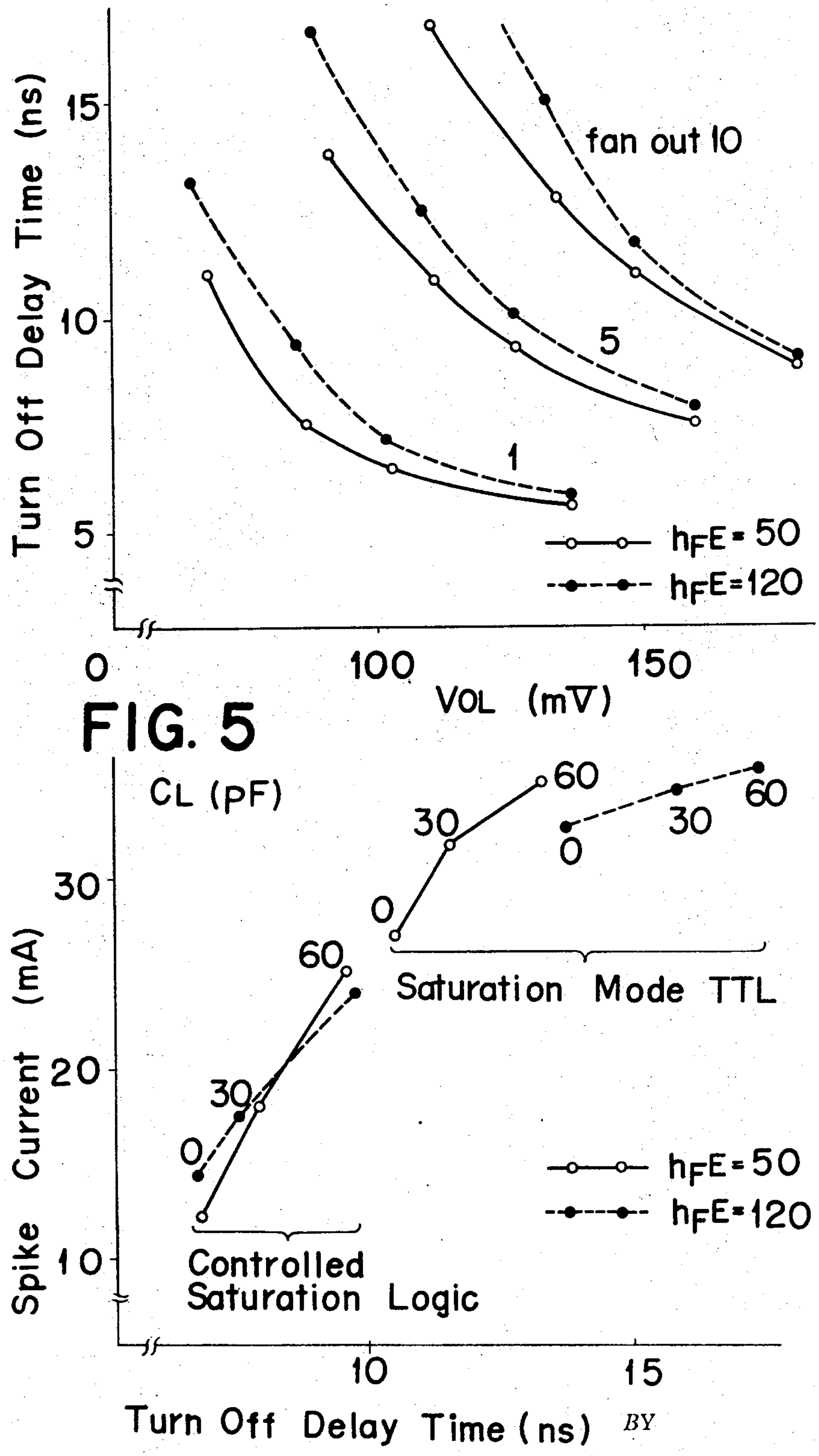
FIGS. 4 and 5 show characteristics of the switching circuit shown in FIG. 3.

The electrical characteristics of the circuit shown in FIG. 3 are shown in FIGS. 4 and 5. FIG. 4 shows the relationship between the output "0" level voltage $V_{OL}$ and the turn-off delay time when the saturation levels of the inverter transistor 5 are varied. As can be noted from FIG. 4 when the number of the load circuit (fan out) connected to the output terminal 2 is varied the voltage $V_{OL}$ shifts automatically. Characteristics for different current amplification factors $h_{FE}$ of the transistor 5 are shown by solid lines and dotted lines. As can be clearly noted in FIG. 4, when the voltage $V_{OL}$ is increased by about 100 mv. from a low value thereof, that is from the state of high saturation of the transistor 5 to the state of lower saturation, the delay time decreases rapidly. Nevertheless, even when the saturation is decreased to non-saturation, further decrease of the delay time is little. In contrast, maintenance of the voltage $V_{OL}$ at a very high potential of more than 600 mv. to realise non-saturation as has been the practice in the prior art results in the loss of the noise margin.

FIG. 5 compares the electrical characteristics of the embodiment shown in FIG. 3 and those of the conventional saturation type TTL (modified high level TTL) with the abscissa representing the reverse recovery delay time of the inverter transistor 5 and the ordinate representing the peak value of the transient capacitance driving current during the reverse recovery transient period. Again, characteristics for different current amplification factors of transistor 5 are shown by solid and dotted lines. Numerals on solid and dotted lines show the values of the load capacitance $C_L$ connected to the output terminal 2. FIG. 5 shows that the delay time and the transient driving current of the embodiment shown in FIG. 3 are smaller than those of the prior art saturated TTL. From this it can be readily understood that it is also possible to greatly reduce the power consumption during transient period which is proportional to the product of the delay time and transient driving current. Further, the effect of the variation in the current amplification factor of transistor 5 upon the characteristics is very small, thus assuring uniform characteristics irrespective of the manufacturing conditions. FIG. 6 shows an example of a TTL–NAND gate wherein a multiple-emitter transistor 16 is utilised as an AND gate instead of diodes 13 shown in FIG. 3. The construction of this switching circuit is different from that shown in FIG. 3 in that the resistor 15 which, in the case of FIG. 3, is shown connected between the base and emitter electrodes of transistor 7, is now connected between the base and collector electrodes of the transistor 7 to apply a negative feedback to the base electrode of transistor 7 from its collector electrode. In addition, a collector resistor 17 of the transistor 6 is also used as a portion of the collector resistor of the transistor 9 to apply feedback also to the transistor 7, thus decreasing the danger of oscillating the entire circuit.

FIG. 7 illustrates another embodiment which is identical to FIG. 3 except that a small resistor 18 is included between the emitter electrode of transistor 7 and the collector electrode of transistor 5 to adjust the degree of saturation thereof. The effect of the resistor 18 is illustrated in FIG. 8 as an operating point *f* of the transistor 5. In this figure the abscissa shows the collector-emitter voltage $V_{CE5}$ of the transistor 5 while the ordinate shows the collector current $I_{C5}$ of the transistor 5. Curves *a, b, c* and *d* show the relationship between $V_{CE5}$ and $I_{C5}$ for different values of base current of transistor 5 and the shaded region A represents a region in which the transistor 5 is in the non-saturated state. The degree of saturation is higher where $V_{EC5}$ is lower in the saturated region or the ratio of $I_{C5}$ to base current $I_{B5}$, $I_{C5}/I_{B5}$ is smaller. In the example shown in FIG. 3, saturation of transistor 5 is controlled such that, in response to the load connected to the output terminal 2, the operating point is caused to move along a dotted line *e* shown in FIG. 8. With this circuit, from the standpoint of circuit stability, it is desirable that the transistor 5 should not assume the non-saturated state. As shown in FIG. 8, the smaller is $I_{C5}$, the closer is the transistor 5 to non-saturated state.

Referring to the circuit shown in FIG. 7, when the load current flowing into terminal 2 is small and where the current by-passed by the diode 12 in the branch circuit and flowing through the transistor 7 is large, the voltage drop $V_{18}$ across the resistor 18 becomes large. This causes the operating point of the transistor 5 to vary along a dot and dash line *f* shown in FIG. 8. Since the inclination of this curve is not so steep as the dotted line *e*, the distance to the non-saturated region can be maintained substantially constant regardless of the variation in the collector current $I_{C5}$. Thus, for smaller values $I_{C5}$, it is possible to stabilize the circuit by slightly increasing the degree of saturation of the transistor 5.

FIGS. 9*a* to 9*f* illustrate examples of branch circuits. In the circuit shown in FIG. 9*a*, the circuit is branched by a diode 19 connected to a point close to the base electrode of the transistor 5. With this circuit, as the transistor 7 becomes saturated there is a difficulty that the base current supplied by the transistor 6 increases considerably. This defect can be eliminated by the circuits shown in FIGS. 9*b* to 9*f*.

Figure 9A:
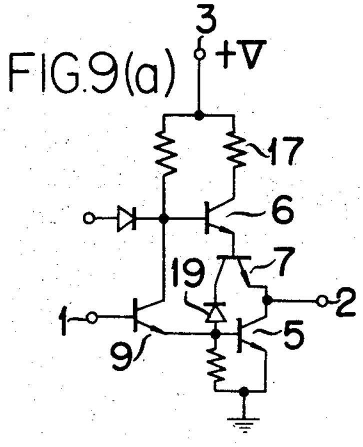
Figure 9B:
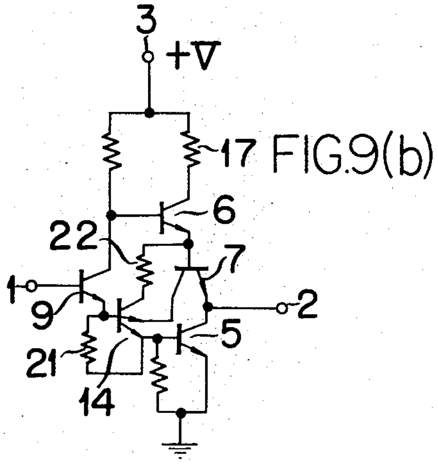

In FIG. 9*b*, the transistor 14 preceding the transistor 5 takes the form of the multiple-emitter construction to divide current by two emitters. Different from the previous embodiments shown in FIG. 7 and FIG. 9*a* wherein the current is branched by a diode, as the transistor 14 provides the transistor function, it is possible to shorten the forward recovery period during which the transistor is turned on from off state. A resistor 21 is added for the purpose of taking out the base stored charge of the transistor 14 when the transistor 5 changes from on to off state, while a resistor 22 is added for the purpose of limiting the collector current of the transistor 14 at the steady on state.

Figure 9C:
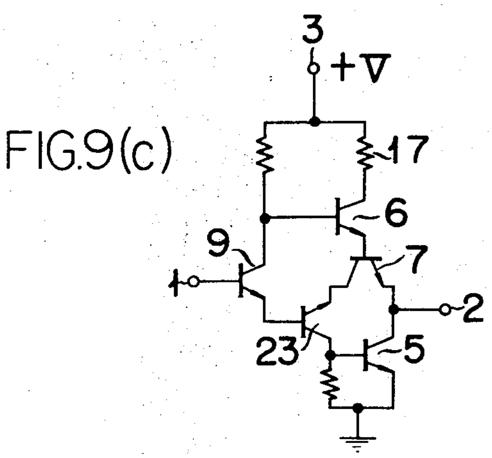

In FIG. 9*c*, the emitter and collector electrodes of the transistor 14 are utilised as the branch circuit, said collector electrode being connected to the base electrode of the transistor 5 and said emitter electrode to the collector electrode of the transistor 7. When the transistor 5 tends to turn off from on state upon disappearance of the input current transistor 6 supplies a large transient current. Thus, traisistors 7 and 23 operate to derive base storage charge of the transistor 5 thereby supplying current to the collector electrode of the transistor 5. Consequently the reverse recovery of the transistor 5 is accelerated thus shortening the transient period.

Figure 9D:
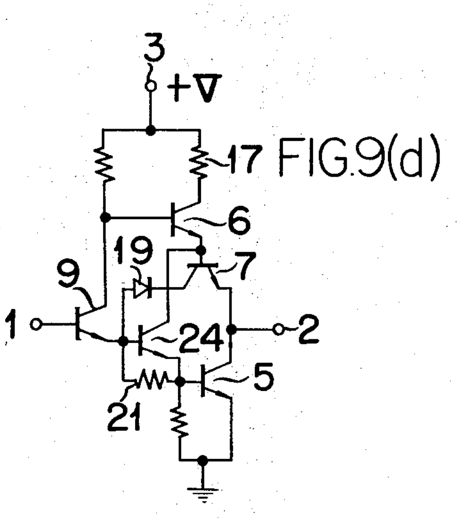

FIG. 9*d* illustrates an example wherein the current is branched from a point spaced from the base electrode of the transistor 5 by a distance more than one P-N junction. In this case as the P-N junction to be interposed is utilised the base-emitter junction of a transistor 24 and by connecting the collector electrode thereof to a source of supply it becomes possible to form a circuit capable of automatically adjusting the whole drive current supplied from the source in accordance with the load.

In the embodiment shown in FIG. 9*d*, the collector electrode of transistor 24 is connected to the emitter electrode of the transistor 6 and the base input current of transistor 24 is controlled by the transistor 7 in accordance with the current from the load connected to the output terminal 2. Thus, as the voltage of the output terminal 2 increases with the increase of the load current the emitter current of the transistor 7 decreases which in turn decreases the current branched by the diode 19, thus increasing the base input current of the transistor 24. As this input current is supplied to the base electrode of the transistor 5 after being amplified, it is possible to supply sufficiently large base driving current even for large load currents. Thus this circuit has an ability to automatically adjust the drive current for large variations of load current so that this circuit is advantageous in that it is not required to pass unnecessarily large drive current for small load currents.

Figure 9E:
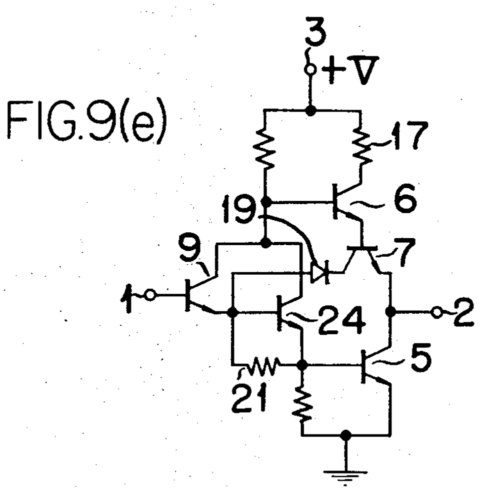

FIG. 9*e* also shows an embodiment wherein the current is branched from the base electrode of the transistor 24 by means of the diode 19. In this case, however, the collector electrode of the transistor 24 is connected to the collector electrode of the preceding transistor 9 whereby the current amplification factor of the drive circuit for the transistor 5 is increased during the forward recovery transient period.

Figure 9F:
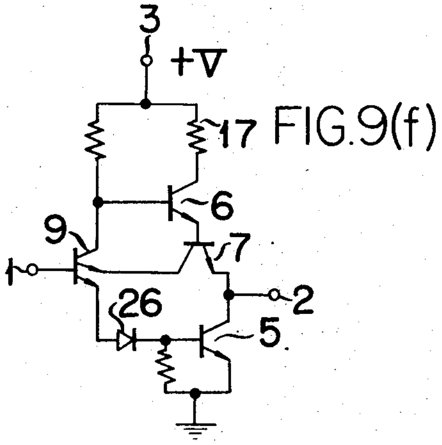

In a still further modification shown in FIG. 9*f*, the transistor 9 is in the form of a multiple emitter construction with its collector electrode connected to the base electrode of the transistor 6 to trigger it. One of the emitter electrodes is utilised to by-pass the current. This construction is advantageous in that it simplifies the circuit arrangement.

Figure 10A:
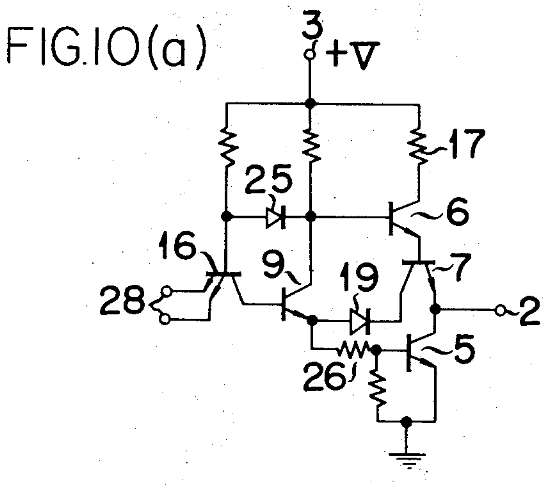

In FIG. 10*a*, an AND gate comprising a multiple-emitter transistor 16 is combined with the circuit shown in FIG. 9*a* to form a TTL NAND gate circuit the collector electrode of the transistor 9 will be clamped by the diode 25 to be maintained in the non-saturated state so that the starting of the transistor 6 is hastened during the reverse recovery time. A resistor 26 is included to slightly increase the potential of the branching point so as to cause transistor 7 to by-pass current.

Figure 10B:
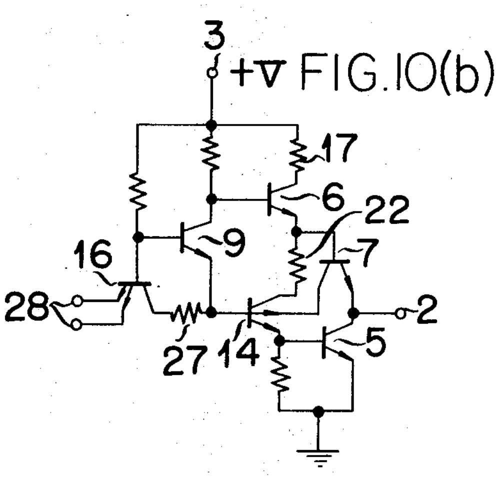

FIG. 10*b* shows a circuit wherein an AND gate comprising a multiple emitter transistor 16 is combined with the circuit shown in FIG. 9*b*. Different from the conventional TTL circuit, the base electrode of the amplifying transistor 9 is connected to the base electrode of the gate transistor 16 and the collector electrode of the gate transistor 16 is connected to the emitter junction of the transistor 9 via resistor 27. With the construction of the AND gate circuit illustrated, as the transistor 16 is in the saturated state when the "0" level voltage is applied at the input terminal 28, its collector potential is near the "*O*" level potential, and the all forward voltage appearing on the collector electrode at this time is applied to the emitter junction of the amplifying transistor 9. As a consequence, the level of the input voltage changes from "0" to "1" the potential drop across resistor 27 will be added to the potential drop across the collector junction of the transistor 16 when any appreciable amount of current flows through the collector electrode of the transistor 16, thus applying a forward voltage to the transistor 9 sufficient to operate it. For this reason, the forward recovery period of the inverter transistors is greatly shortened compared to the conventional circuit in which the potential difference across the emitter junction of the transistor 9 is increased from zero volt. Considering the transient period during which the circuit changes to off state from on state, transistor 16 is effective to derive the stored charge in the base electrode of the transistor 14 though resistor 27 while the stored charge in the base electrode of the transistor 9 is derived through the emitter electrode of the transistor 16. This shortens the reverse recovery transient period of transistors 9 and 14, thus greatly reducing the transient time of the circuit.

Although the P-N junction employed in the branch circuit of this invention (in the illustrated example the emitter junction of the transistor 14 connected to transistor 7) changes from forward to reverse bias as the output potential level changes from a low "on" state to a high "off" state, the reverse recovery current has a tendency to slightly lag the reverse recovery of the circuit, should such reverse recovery current flow into the base electrode of the transistor 5 at this time. By utilising a TTL AND circuit as shown in this embodiment said transient current is supplied to input terminal 28 via the resistor 27. For this reason, the illustrated TTL AND gate circuit is advantageous for the circuit of this embodiment. Combinations as shown in FIGS. 10*a* and 10*b* are also applicable to respective circuits shown in FIGS. 9*c* to 9*f*.

Figure 11:
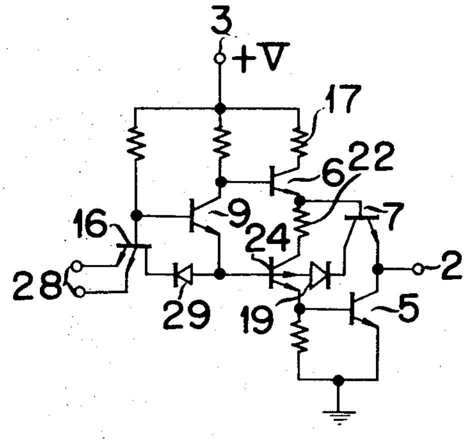

In the embodiment shown in FIG. 11, the resistor 27 of the embodiment shown in FIG. 10*b* is substituted by a diode 29 with the same results. The branch circuit is idenical to that employed in FIG. 9*d*, that is, the circuit is branched from the base electrode of the transistor 24 by means of a diode 19.

Figure 12:
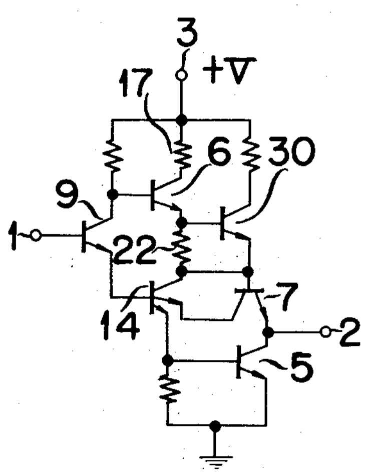

Although in the above embodiments only one transistor 6 was connected to the base electrode of the transistor 7, in the modified embodiment shown in FIG. 12, another transistor 30 is added to the transistor 6 to increase the transient driving effect. More particularly, during the transient period during which the output transistor 5 changes its state from on to off, the amplifying transistor 9 in the preceding stage recovers, so that transistor 6 first starts to start the transistor 30 by its emitter current to inject a large current into the collector electrode of the transistor 5, thus fastening the recovery thereof.

As can be illustrated by the foregoing embodiments while there are many modifications of this invention, operation of the second transistor 7 controls the output transistor to a shallow saturation state. Further, the second transistor 7 also controls the first transistor 6 to an operating state of small current.

Accordingly, during the transient period in which the switching transistor changes its state from on to off state, the transistor 7 can start very rapidly, this in cooperation with the shallow saturation state of the output transistor 5, is effective to greatly reduce the reverse recovery transient period thereof. As has been pointed out before it has been extremely difficult to prevent variation in the current amplification factor of transistors due to their manufacturing conditions. However, according to the circuit of this invention, control of the saturation of the switching transistor in its on state can be ensured irrespective of the increase in the current amplification factor, so that it is not necessary to consider the increase in the change storage time during the reverse recovery time. Thus, in accordance with this invention it is possible to provide semiconductor switching circuit of uniform characteristics.

Further the excess charge stored in the base electrode of the inverter transistor in the on state is controlled to the minimum so that the excess charge can be diminished very rapidly during the reverse recovery time thereby greatly decreasing useless transient power consumption.

Although the above embodiments have been described in terms of an NPN type transistor it will be obvious to those skilled in the art to use a PNP type transistor with equally satisfactory results. In this case, however, the polarity of the diode and the direction of input and load current should be reverse.

It is appreciated that the invention is amenable to numerous other modifications, and it is of course desired to cover by the appended claims all such modifications as fall within the true spirit and scope of the invention.

What is claimed is:

1. A switching circuit comprising:

an inverter transistor having its output side connected to a capacitive load;

a first transistor having its emitter electrode connected to the output side of said inverter transistor to accelerate charge and discharge of said capacitive load at the time of switching said inverter transistor;

a second transistor interposed between said first transistor and said inverter transistor, the emitter electrode of said second transistor being connected to the output side of said inverter transistor and the base electrode of said second transistor being connected to the emitter electrode of said first transistor;

a drive circuit connected to the input side of said inverter transistor; and a branch circuit branched from said drive circuit, said branch circuit being connected to the collector electrode of said second transistor to by-pass a portion of the drive current around said second transistor when said drive current is applied to said inverter transistor to render it conductive, thereby controlling the saturation of said inverter transistor.

2. A switching circuit according to claim 1 wherein said branch circuit includes a reverse current blocking P-N junction which prevents a portion of the capacitive drive current from said first transistor from flowing to the drive circuit of said inverter transistor.

3. A switching circuit according to claim 1 wherein said drive circuit includes an input amplifying transistor having its emitter electrode connected to supply drive current to the base electrode of said inverter transistor, the collector electrode of said input amplifying transistor being coupled to the base electrode of said first transistor.

4. A switching circuit according to claim 1 wherein said drive circuit of said inverter transistor includes at least one P-N junction connected in the drive current path between the base electrode of said inverter transistor and the junction of said branch circuit in order to shift the signal level.

5. A switching circuit according to claim 1 wherein said branch circuit includes a transistor having two emitter electrodes, one of said emitter electrodes being connected to the base electrode of said inverter transistor to supply drive current to said inverter transistor, and the other of said emitter electrodes being connected to the collector electrode of said second transistor to act as a reverse current blocking P-N junction.

6. A switching circuit according to claim 1 wherein said drive circuit of said inverter transistor includes an amplifying transistor for the drive current, the emitter electrode of said amplifying transistor being connected to the base electrode of said inverter transistor, and the collector electrode of said amplifying transistor being connected to the emitter electrode of said first transistor.

7. A switching circuit according to claim 3 which further includes an input gating transistor having a collector electrode connected to the branching point of the branch circuit through an impedance, the base electrode of said gating transistor being connected to the base electrode of said amplifying transistor, and a source of supply connected to the base electrode of said gating transistor through an impedance and wherein the input signal is supplied from the emitter electrode of said gating transistor.

References Cited

UNITED STATES PATENTS

| | | | |
|---|---|---|---|
| 3,427,474 | 2/1969 | Chua | 307—214X |
| 3,473,047 | 10/1969 | Bohn et al. | 307—215 |

OTHER REFERENCES

Pub. I (Atwood): "Logic Circuit" in IBM Technical Disclosure Bulletin, vol. 8, No. 2, July 1965, pp. 317-318.

STANLEY D. MILLER, Jr., Primary Examiner

U.S. Cl. X.R.

307—213, 215